US012260438B2

(12) United States Patent
Knight et al.

(10) Patent No.: US 12,260,438 B2
(45) Date of Patent: Mar. 25, 2025

(54) OPTICAL SCANNING USING RECEIPT IMAGERY FOR AUTOMATED TAX RECONCILIATION

(71) Applicant: Maplebear Inc., San Francisco, CA (US)

(72) Inventors: Benjamin Knight, Oakland, CA (US); Benjamin Peyrot, San Francisco, CA (US); Djordje Gluhovic, Oakland, CA (US); Rohit Turumella, San Jose, CA (US); Alice Han, San Mateo, CA (US)

(73) Assignee: Maplebear Inc., San Francisco, CA (US)

( * ) Notice: Subject to any disclaimer, the term of this patent is extended or adjusted under 35 U.S.C. 154(b) by 184 days.

(21) Appl. No.: 17/853,619

(22) Filed: Jun. 29, 2022

(65) Prior Publication Data
US 2023/0316350 A1    Oct. 5, 2023

Related U.S. Application Data

(60) Provisional application No. 63/326,088, filed on Mar. 31, 2022.

(51) Int. Cl.
*G06Q 30/04* (2012.01)
*G06Q 20/20* (2012.01)
(Continued)

(52) U.S. Cl.
CPC .......... *G06Q 30/04* (2013.01); *G06Q 20/207* (2013.01); *G06Q 40/10* (2013.01); *G06Q 40/12* (2013.12); *G06Q 40/123* (2013.12)

(58) Field of Classification Search
None
See application file for complete search history.

(56) References Cited

U.S. PATENT DOCUMENTS

| 2006/0155606 A1* | 7/2006 | Simonte | G06Q 30/0601 |
| | | | 705/26.1 |
| 2010/0090694 A1* | 4/2010 | Heid | A61B 5/055 |
| | | | 324/309 |

(Continued)

FOREIGN PATENT DOCUMENTS

CA    2970446 A1 *  1/2018   ........... G06Q 20/047

OTHER PUBLICATIONS

PCT International Search Report and Written Opinion, PCT Application No. PCT/US2023/14378, Sep. 19, 2023, 6 pages.

*Primary Examiner* — Fateh M Obaid
(74) *Attorney, Agent, or Firm* — Fenwick & West LLP

(57) ABSTRACT

An online concierge system requests an image of a receipt of an order from a picker after the picker fulfills the order at a store. The online concierge system performs image processing on the image of the receipt and uses machine learning and optical character recognition to determine a tax amount paid for the order and a confidence score associated with the tax amount. The online concierge system may use the machine learning model for segmenting extracted text in the image of the receipt into tokens. The online concierge system may then determine at least one token associated with a tax item and the tax amount associated with the tax item. The online concierge system communicates the tax amount to the store for reimbursement based on the tax amount and the confidence score.

18 Claims, 14 Drawing Sheets

(51) Int. Cl.
  *G06Q 40/10*    (2023.01)
  *G06Q 40/12*    (2023.01)

(56) References Cited

U.S. PATENT DOCUMENTS

| | | |
|---|---|---|
| 2013/0191256 A1 | 7/2013 | Bleacher et al. |
| 2015/0095205 A1 | 4/2015 | Hebner et al. |
| 2015/0242832 A1* | 8/2015 | Corritori ............. G06Q 20/207 |
| | | 705/19 |
| 2017/0154314 A1* | 6/2017 | Mones ................... G06N 20/00 |
| 2019/0244020 A1 | 8/2019 | Yoshino et al. |
| 2020/0074432 A1 | 3/2020 | Valdman et al. |
| 2021/0125170 A1* | 4/2021 | Woodall ................. G06Q 20/02 |
| 2021/0174214 A1* | 6/2021 | Venkatesan .............. G06N 3/08 |
| 2021/0203645 A1* | 7/2021 | Baker ................. G06F 21/6263 |
| 2022/0172301 A1* | 6/2022 | Guedalia ............... G06F 40/186 |
| 2022/0284379 A1* | 9/2022 | Adams ................ G06Q 20/047 |

* cited by examiner

OPTICAL SCANNING USING RECEIPT IMAGERY FOR AUTOMATED TAX RECONCILIATION

CROSS-REFERENCE TO RELATED APPLICATION

This application claims the benefit of U.S. Provisional Application No. 63/326,088, filed Mar. 31, 2022, which is incorporated by reference herein in its entirety.

BACKGROUND

This disclosure relates generally to a computer-implemented process for improving accuracy of a delivery system, and specifically to determining a tax amount based on image analysis of a physical receipt by a computer system.

In current delivery systems, shoppers, or "pickers," fulfill orders at a physical warehouse, such as a retailer, on behalf of customers as part of an online shopping concierge service. In many states, the online shopping concierge system is responsible for paying taxes based on the orders that customers place. At the same time, retail partners typically charge taxes at the point-of-sale when shoppers purchase the necessary goods. This may place the online shopping concierge system in an undesirable situation of paying taxes twice. To avoid this issue, the retail partners may simply stop charging tax for orders within the online shopping concierge system's purview. For example, the point-of-sale (POS) system may be informed that a specific purchase is being made by the online shopping concierge system. With this knowledge, the tax amount is suppressed, and the online shopping concierge system is not charged for the tax at point-of-sale.

However, this solution may not be available in all instances. For example, a retailer may not have the technical expertise or resources to customize their POS system in the required manner. Because of this, a more broadly applicable approach to collecting the necessary tax data centers on using the receipts printed out by the POS system.

SUMMARY

While the online shopping concierge system can use receipt imagery to mitigate the issue of double taxation for many retailers, this approach may introduce other problems. Depending on whether the online shopping concierge system opts for optical character recognition and machine learning models, or relies on human reconciliation, one is confronted with the issues of output reliability or human resourcing requirements respectively.

One solution to this problem is an arrangement with the retailers called "receipt suppression." In this system, the public POS system displays a QR code. The shopper scans this code, which sends a message to the online shopping concierge system that the shopper needs to pay for a specific order. The online shopping concierge system's backend then sends a message to the retailer's backend that this is an order for the online shopping concierge system. The retailer then notifies its POS system that this is an order intended for an online shopping concierge service, and therefore no tax is to be charged and no receipt is to be printed. This solution is feasibly typically only for the largest and sophisticated retailers. For smaller retailers, another approach to the problem of collecting tax data is to use human auditors; however, this solution can be expensive.

In accordance with one or more aspects of the disclosure, a delivery system generates and uses machine learning models to identify a tax item and corresponding tax amount paid in an image of a receipt of an order. In some embodiments, the machine learning models are trained using images of physical receipts, where pickers may upload the images of receipts and input known tax amounts paid at a store. The training data are used to build a deep-learning detection model capable of determining whether the receipt is readable and, if so, to identify items and the corresponding amounts in the receipt. The identified tax amount can be used for tax reconciliation with the store for reimbursement. In some embodiments, the delivery system may determine a confidence score for the associated tax amount, and a tax amount having a high confidence score can be directly sent for tax reconciliation without additional human auditing. As such, the delivery system provides an automatic tax reconciliation functionality with a high degree of accuracy and a reduced need for human labor.

In accordance with one or more additional aspects of the disclosure, a method for automated reconciling tax between an online concierge system and a retail store includes sending an order to a shopper for fulfillment at the store. The method includes receiving an image of a receipt for the order from the shopper after fulfillment of the order. The method includes scanning the receipt, using image processing, to identify the tax item in the receipt. The method includes identifying an amount of the tax paid at the store and determining a confidence score associated with the identified tax amount. The method includes communicating the tax amount to the store for reimbursement based on the tax amount and the confidence score.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
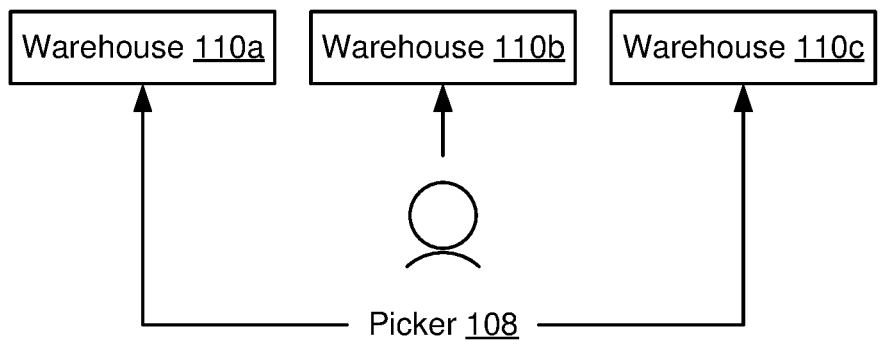
FIG. 1 illustrates an environment of an online shopping concierge service, according to one or more embodiments.
Figure 1:
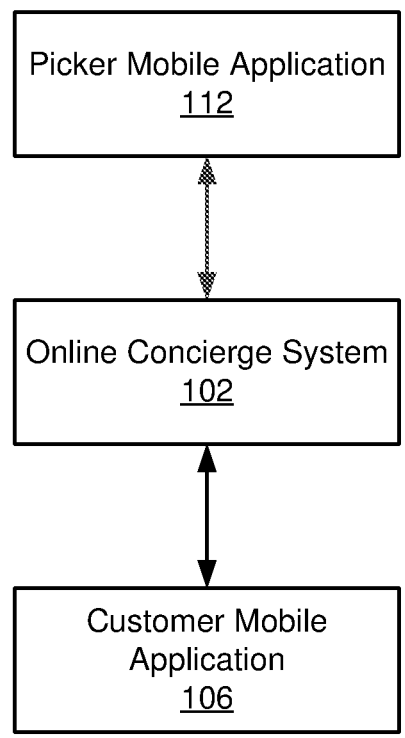

FIG. 1 illustrates an environment 100 of an online platform, according to one or more embodiments. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The picker 108 travels between a warehouse and a delivery location (e.g., the customer's home or office). A picker 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each picker 108 fulfills an order received from the online concierge system 102 at one or more warehouses 110, delivers the order to the customer 104, or performs both fulfillment and delivery. In one embodiment, pickers 108 make use of a picker mobile application (PMA) 112 which is configured to interact with the online concierge system 102.

Figure 2:
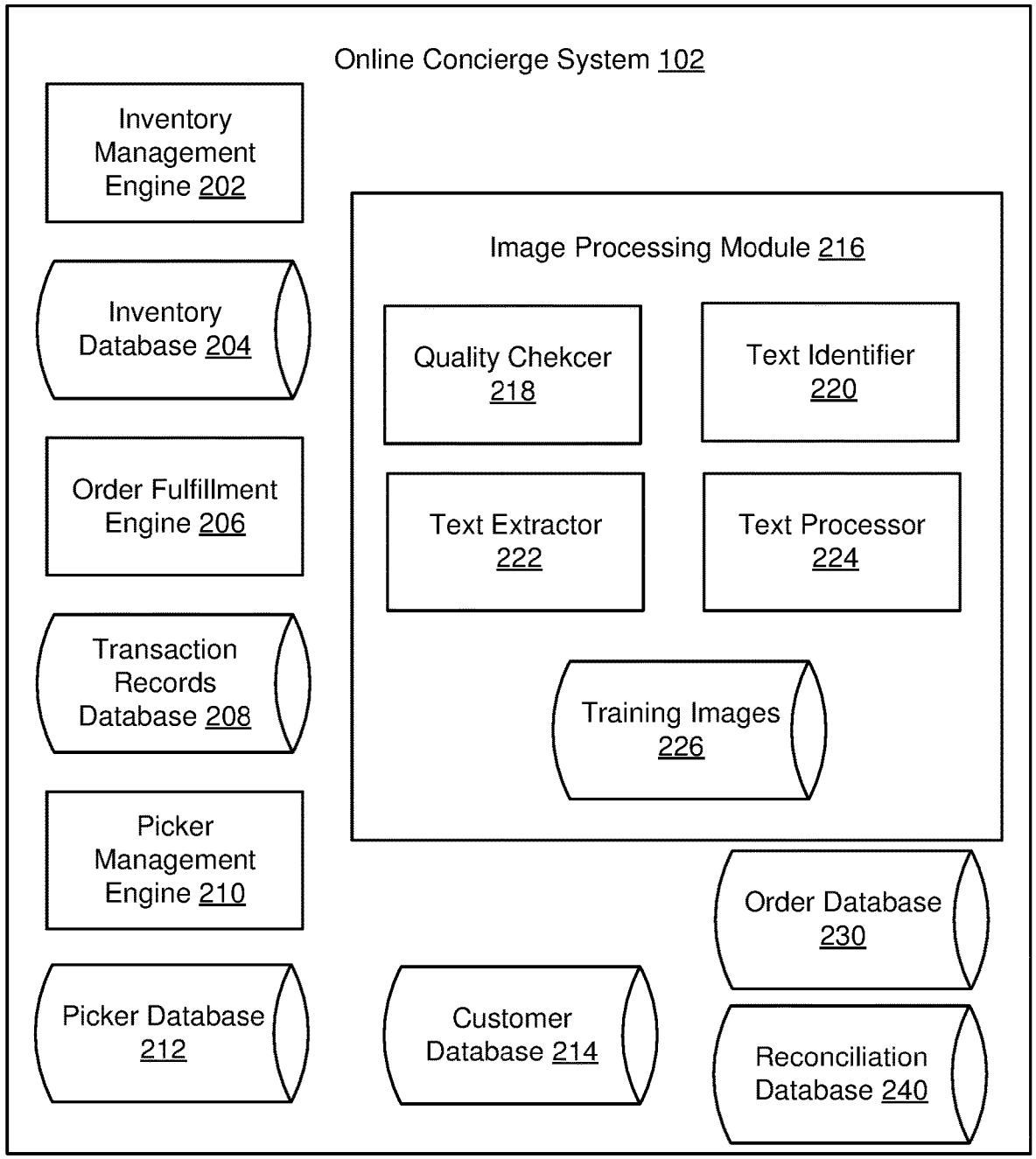
FIG. 2 is a diagram of an online shopping concierge system, according to one or more embodiments.

FIG. 2 is a diagram of an online concierge system 102, according to one or more embodiments. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both quantitative and qualitative information about items, including size, color, weight, SKU, serial number, and so on. The inventory database includes pricing information about each item, such as a unit price, a price per weight, a price per quantity (e.g., the price of a 6-pack of a juice may be more than half of the price of a 12-pack of the same juice), and/or an estimated price thereof (e.g., prices of produce may vary based on season and availability of the produce). The inventory database 204 also stores information about various item properties, such as vegan, organic, gluten free, etc. The inventory database 204 also stores purchasing rules associated with each item, if they exist. For example, age-restricted items such as alcohol and tobacco are flagged accordingly in the inventory database 204. The inventory management engine 202 may receive updated item information from a picker 108, such as a property of an item in an inventory database 204, and adds the updated item information to the inventory database 204.

The online concierge system 102 includes an order fulfillment engine 206 which is configured to synthesize and display an ordering interface to each customer 104 (for example, via the CMA 106). The order fulfillment engine 206 is also configured to access an inventory database 204 in order to determine which items are available at which warehouses 110, and to identify properties associated with the items. The order fulfillment engine 206 determines a sale price for each item ordered by a customer 104. In one embodiment, the order fulfillment engine determines an estimated price for an order as a whole, based on the sale prices of each item. Prices set by the order fulfillment engine 206 may or may not be identical to in-store prices determined by retailers (which is the price that customers 104 and pickers 108 would pay at retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate warehouse to fulfill the order based on one or more parameters, such as a probability of item availability, the contents of the order, the inventory of the warehouses, and the proximity to the delivery location. The picker management engine 210 then identifies one or more appropriate pickers 108 to fulfill the order based on one or more parameters, such as the pickers' proximity to the appropriate warehouse 110 (and/or to the customer 104), his/her familiarity level with that particular warehouse 110, and so on. For example, the picker management engine 210 identifies pickers by comparing the parameters to data retrieved from a picker database 212. The picker database 212 stores information describing each picker 108, such as his/her name, gender, rating, previous shopping history, and so on.

As part of fulfilling an order, the order fulfillment engine 206 and/or picker management engine 210 may also access a customer database 214 which stores information describing each customer. This information could include each customer's name, address, gender, shopping preferences, favorite items, stored payment instruments, and so on.

The order fulfillment engine 206 interacts with the image processing module 216 to adjust an estimated cost of an order based on an image of a receipt that contains actual amounts purchased of items. In one embodiment, the order fulfillment engine 206 determines an estimated price of the order based on ordered quantities of items. Upon receiving an image of the receipt for the order, the image processing module 216 determines a price adjustment based on the difference between an ordered amount and an actual amount purchased of each item. Based on the price adjustment, the order fulfillment engine 206 charges the payment instrument associated with the customer 104 an adjusted cost for the order.

In another embodiment, the order fulfillment engine 206 first charges the payment instrument the estimated price of the order. The image processing module 216 determines the price adjustment, and if the actual amount purchased is less than the ordered amount, the order fulfillment engine 206 reimburses the customer 104 the price adjustment. If the actual amount purchased is greater than the ordered amount, the order fulfillment engine 206 charges the payment instrument associated with the customer 104 the price adjustment. Furthermore, the order fulfillment engine 206 may adjust the cost charged for an order based on a net sum of the differences between the ordered amount and actual amount purchased of each item in the order. That is, the order fulfillment engine 206 may determine a price adjustment for each item in the order and charge or reimburse the customer 104 for the order as a whole based on a net sum of the price adjustments.

As part of fulfilling an order, the order fulfillment engine 206 and/or image processing module 216 may also access an order database 230 which stores information describing each order. This information may include a set of items included in an order, a price per unit of each item, a quantity of each item, a total price per item, information about the customer 104 who placed the order, information about the picker 108 who is picking the order, a specified warehouse 110, or mappings to such information as stored in the inventory database 204, the transaction records database 208, the picker database 212, and/or the customer database 214. Additionally, the order database 230 may include information about the status of the order such as an order date, a fulfillment date or estimated fulfillment date, a delivery time or estimated delivery time or window, and one or more images of the order receipt. The image of the receipt is processed by the image processing module 216.

The online concierge system 102 includes a reconciliation database 240 for tax reconciliation. The reconciliation database 240 interacts with the image processing module 216 to store tax data of an order based on an image of a receipt that contains actual tax amounts paid for the order to the retailers. In one embodiment, upon receiving an image of the receipt for the order, the image processing module 216 identifies the tax amount recorded on the receipt and determines a confidence score of the identified tax amount. Based on the tax amount and the confidence score, the image processing module 216 may send the tax data to the reconciliation database 240 and/or a queue for a subsequent review by human auditors. The tax data in reconciliation database 240 may be aggregated and sent to the retailers for tax reconciliation periodically.

Image Processing

The online concierge system 102 includes an image processing module 216 for processing images of receipts associated with orders. After fulfillment of an order, an image of a receipt of the order is received at the online concierge system 102, for example from the picker 108 via the PMA 112. The online concierge system 102 then stores the image in the order database 230. The image of the receipt is analyzed by the image processing module 216, which uses one or more image processing algorithms as discussed below to extract text associated with items, weights, tax, and/or prices on the receipt from the image of the receipt. In some embodiments, the image processing module 216 may be partially or wholly implemented by a third-party or a cloud-based model. In some embodiments, the image processing module 216 includes a quality checker 218, a text identifier 220, a text extractor 222, and a text processor 224. The image processing module 216 may also store a set of training images 226.

The quality checker 218 determines whether the image is of sufficient quality to resolve the text of the receipt. An image is of sufficient quality, for example, if the image is of a receipt and not blurry. If the quality checker 218 determines the image is of sufficient quality, the image processing continues. If the quality checker 218 determines the image is not of sufficient quality, the image processing module 216 returns via the PMA 112 a prompt to the picker 108 to take another image of the receipt.

The quality checker 218 may be implemented as a machine learning model trained on training images 226 to determine whether the image is of sufficient quality. For example, the quality checker 218 may be trained on training images 226 that include both positive images of receipts (i.e., show a clear and itemized receipt) and negative images of receipts (i.e., are blurry images, images of objects other than receipts). In other embodiments, the quality checker 218 may determine the variance of a fast Fourier transform of the image to determine whether the image is blurry.

The text identifier 220 determines locations of text within the image of the receipt. In some embodiments, the text identifier 220 is a machine learning model trained on the training images 226. The text identifier 220 obtains a bounding box for instances of text in the image of the receipt. In some embodiments, the text identifier 220 and the quality checker 218 may be one machine learning model that returns a null set of bounding boxes if the text cannot be resolved, i.e., the image is not of sufficient quality.

The text extractor 222 determines the words and numerical values of the text contained within the image of the receipt. In some embodiments, the text extractor 222 applies one or more optical character recognition (OCR) algorithms to the bounding boxes determined by the text identifier 220. In embodiments without the text identifier 220, the text extractor applies OCR to the whole image to determine the text within the receipt.

The text processor 224 analyzes the text determined by the text extractor 222 to determine items and their associated amount purchased. That is, the text processor 224 identifies text associated with an item description. The text processor 224 further identifies an amount and total price associated with the item. The text processor 224 can identify amounts that are whole values (e.g., 4 bananas) and amounts that are measured quantities (e.g., 0.96 lbs. of apples) associated with variable weight items. The text processor 224 may specifically classify amounts as whole values and measured quantities. The measured quantities representing the actual amount purchased can be compared by the order fulfillment engine 206 to the ordered amount of the item such that the customer 104 is charged appropriately for the variable weight item. The text processor 224 may further analyze the text determined by the text extractor 222 to determine a tax item included in the receipt, for example, an amount of taxes paid as recorded on the receipt. In some embodiments, the text processor 224 may specifically recognize the word "tax" and identify an amount and/or percentage value associated with the word "tax."

In some embodiments, the text processor 224 is implemented as a rules-based natural language processing (NLP) algorithm. In other embodiments, the text processor 224 may classify the instances of text into categories, e.g., name of item, amount, total price, tax. Further, the text processor determines the amount and the total price for the item spatially by determining the corresponding text. For example, the numerical values representing the amount and total price closest to the item name on the receipt are associated with one another. The numerical values representing the amount and/or percentage closest to "Tax" on the receipt are associated. The text processor 224 identifies the items and their associated amounts and prices for all instances of text within the receipt, as determined by the text extractor 222.

In some embodiments, the quality checker 218 may further determine the quality of the analyzed text result by assigning a confidence score. For example, when determining the amount of taxes paid as recorded on a receipt, the quality checker 218 may determine a confidence score of the identified tax amount as an estimate of the level of confidence. The confidence score may be the error or uncertainty score of the identified tax amount and may be calculated using any standard statistical error measurement. In some examples, the confidence score is based in part on the quality of the image of the receipt, e.g., whether the captured image is blurry. Alternatively, the confidence score may be based in part on the quality of the physical receipt, e.g., whether the receipt is crumpled. In one embodiment, the confidence score of the identified tax amount is high, then the online concierge system 102 may directly send the identified tax amount for reconciliation. In another embodiment, the confidence score of the identified tax amount is low, then the identified tax amount and image of the receipt may be sent for display to one or more auditors via an auditor mobile application, which is connected to the online concierge system 102. The one or more auditors may approve or decline the identified tax amount in view of the receipt. If the auditors decline the identified tax amount, they may enter a replacement tax amount.

The training images 226 are a set of images tagged with metadata. The training images 226 are used to train the one or more machine learning models in the image processing module 216. The training images 226 includes images of receipts from warehouses, and each image is tagged with information, such as bounding boxes and identification of the text printed on the receipt, to train the text identifier 220 and/or the text extractor. The training images 226 may also include blurry images and images of other objects to train the quality checker 218.

The training images 226 may be tagged based on receipt information manually input to the online concierge system 102 by a picker 108 through the PMA 112. In some embodiments, the training images 226 are tagged by the text identifier 220 and text extractor 222 and provided to a picker 108 or an auditor for review. For instance, the picker 108 can either accept the tags as-is or edit the tags via the PMA 112, as discussed in FIGS. 6A-6F. Alternatively, an auditor may accept or edit the tags in an auditor mobile application displaying user interfaces comparable to those shown in FIGS. 6A-6F. In other examples, the training images 226 may be tagged by a third party. The training images 226 may reflect actual conditions of images of receipts in the real world, such as crumpled receipts that may distort labeling or lighting that over-exposes or under-exposes portions of text.

The quality checker 218, the text identifier 220, and the text extractor 222 are trained by the image processing module 216 on the training images to determine relative weights of kernel functions within each machine learning model to provide a desired output, the outputs as described above in relation to each module. The kernel function weights may be randomly initialized, e.g., from a Gaussian distribution before training. In some embodiments, the image processing module 216 continually trains the quality checker 218, the text identifier 220, and the text extractor 222 responsive to a picker 108 adding new images to the training images 226.

Customer Mobile Application

Figure 3A:
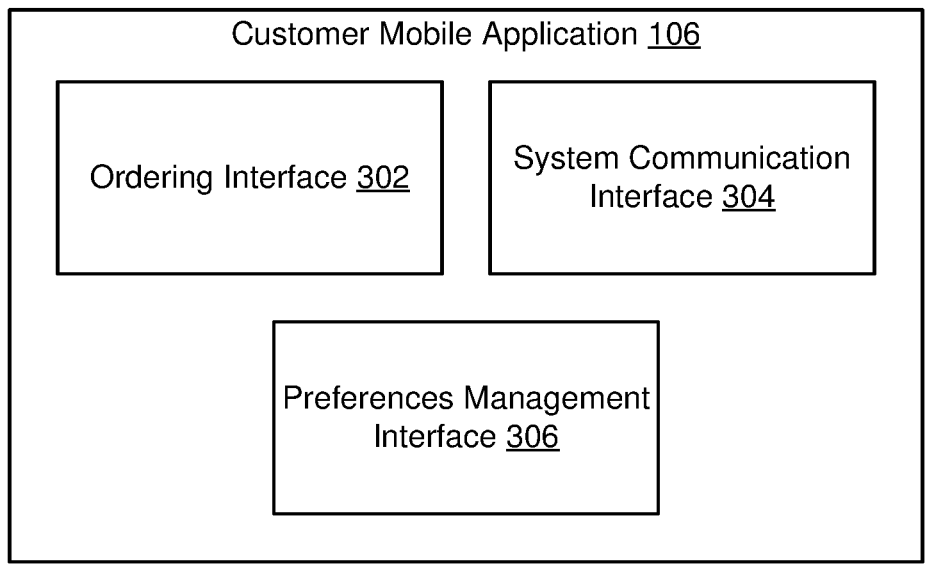
FIG. 3A is a diagram of a customer mobile application (CMA), according to one or more embodiments.

FIG. 3A is a diagram of the CMA 106, according to one or more embodiments. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The system communication interface 304 also enables the customer 104 to submit a complaint or request to view an image of a receipt associated with their order if they believe they have been charged incorrectly for a variable weight item. The CMA 106 also includes a preferences management interface 306 which allows the customer 104 to manage basic information associated with his/her account, such as his/her home address, contact information, and payment instruments. The CMA 106 may communicate the basic information to the online concierge system 102, such that the online concierge system 102 may transmit receipts for the customer's orders including the actual amount of each order. The preferences management interface 306 may also allow the user to manage other details such as his/her favorite or preferred warehouses 110, preferred delivery times, special instructions for delivery, and so on.

Picker Mobile Application

Figure 3B:
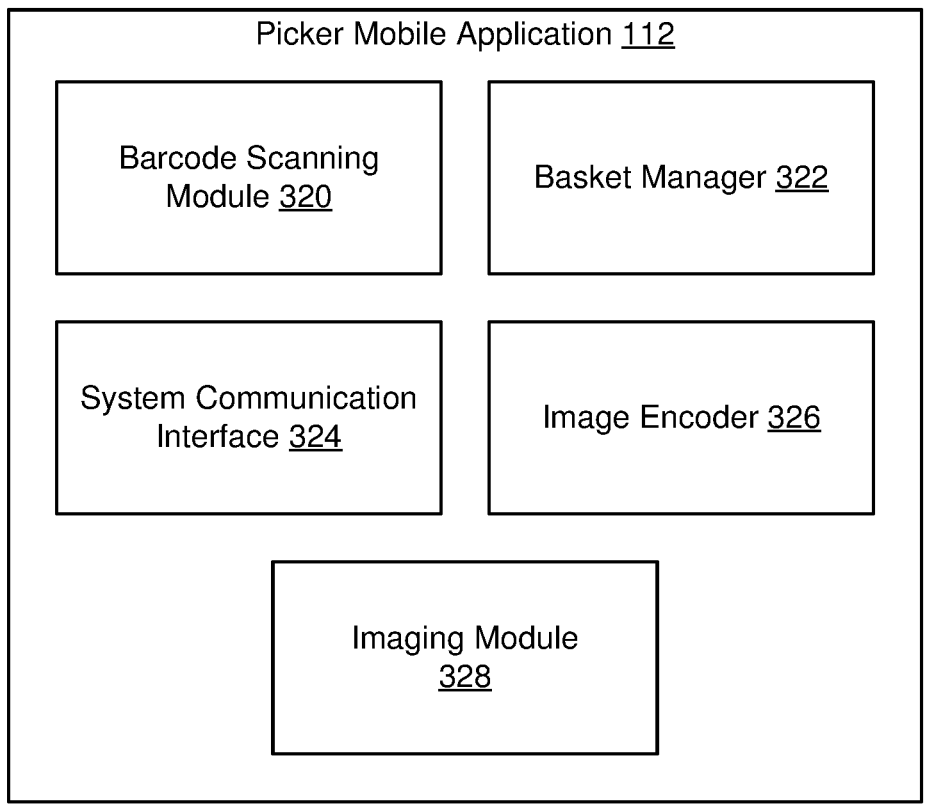
FIG. 3B is a diagram of a picker mobile application (PMA), according to one or more embodiments.

FIG. 3B is a diagram of the PMA 112, according to one or more embodiments. The PMA 112 includes a barcode scanning module 320 which allows a picker 108 to scan an item at a warehouse 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. PMA 112 also includes a basket manager 322 which maintains a running record of items collected by the picker 108 for purchase at a warehouse 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes a system communication interface 324 which interacts with the online shopping concierge system 102. For example, the system communication interface 324 receives an order from the system 102 and transmits the contents of a basket of items to the system 102. The PMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

The PMA 112 includes an imaging module 328, which allows a picker 108 to collect images of receipts via a camera of a mobile device (e.g., cell phone, tablet, or any electronic device with standard communication technologies). In some embodiments, the imaging module 328 additionally allows a picker 108 to collect images of items available at a warehouse when an item in the order is unavailable, e.g., by taking a photograph of one or more items in a warehouse. In another embodiment, the imaging module 328 may also provide an interface for the picker 108 to confirm the image of the receipt and/or the identified contents of the receipt, as discussed in greater detail with respect to FIGS. 5A-5C and 6A-6C. In some embodiments, the imaging module 328 also allows a picker 108 or an auditor to indicate the location and type of an item label in a collected image. For example, a picker 108 (or auditor, who may receive the images via an auditor mobile application for review) may draw a bounding box around an instance of text to indicate that the identified pixels are associated with an instance of text, and select a class associated with the instance of text. The imaging module 328 sends the image of the receipt with the tagged instances of text and their associated classes to the online concierge system 102, which are incorporated into the training images 226.

Determining Tax Amount of Order

Figure 4:
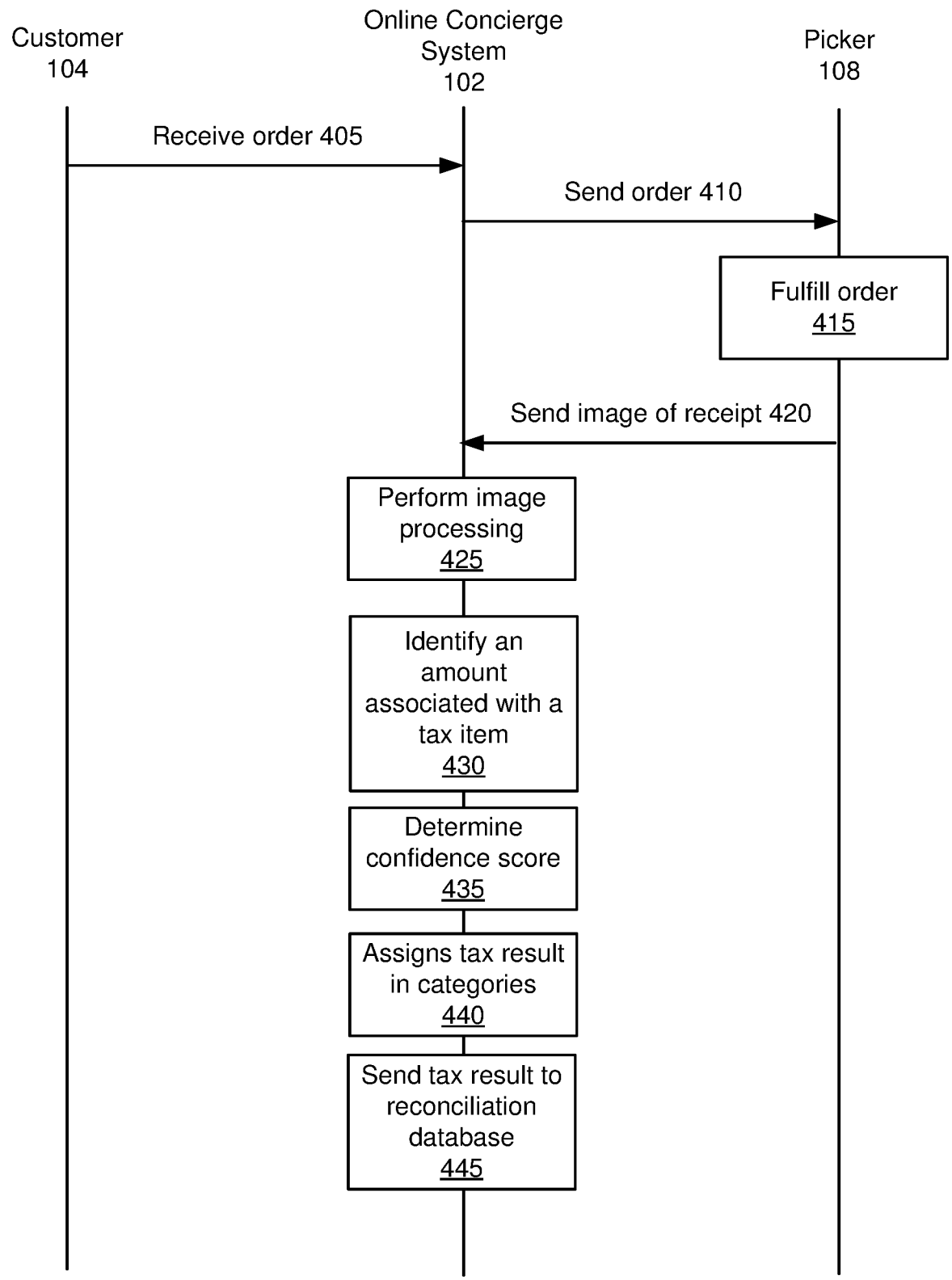
FIG. 4 is a flowchart illustrating a process for determining a tax amount paid for an order to a retailer, according to one or more embodiments.

FIG. 4 is a flowchart illustrating a process 400 for determining a tax amount paid for an order to a retailer, according to one or more embodiments. The customer 104 creates an order by selecting a set of items for purchase through the ordering interface 302 of the CMA 106. The order may specify the set of items for purchase at one or more warehouses 110 (e.g., retailers). The online concierge system 102 receives 405 the order from the customer 104. The online concierge system 102 may receive 405 the order via the CMA 106, as discussed in related to FIG. 1.

The online concierge system 102 sends 410 the order information to the picker 108. The picker 108 receives the order information via the PMA 112. The order fulfillment engine 206 interacts with the picker management engine 210 to select the picker 108 from a set of available pickers.

The picker 108 fulfills 415 the order. The picker 108 goes to one or more warehouses 110 picks and purchases each item as specified in the order. The picker 108 may use the PMA 112 to keep track of the order and the progress of the fulfillment. Subsequent to fulfillment, the picker 108 takes an image of the receipt of the order. In an embodiment where the picker 108 must go to multiple warehouses 110 to fulfill an order, the picker 108 takes an image of each receipt from each warehouse 110 in the process of fulfilling the order.

The picker 108 sends 420 the image of the receipt to the online concierge system 102. The picker 108 may take the image of the receipt using the imaging module 328 of the PMA 112, which integrates with a camera on the picker's mobile device. The image of the receipt can be sent 420 to the online concierge system 102 using the PMA 112.

The online concierge system 102 performs 425 image processing on the image of the receipt. The image processing is performed by the image processing module 216. As described in relation to the image processing module 216, the image processing includes machine learning models and OCR to identify and extract text from the image of the receipt. In particular, the text identifier 220 determines location of text within the receipt, such as by a bounding box, and the text extractor 222 determines the words and numerical values of the text, for example using OCR. Further, in some embodiments, the image processing may contain an initial step, performed by the quality checker 218, of determining whether the image is of sufficient quality to resolve the text of the receipt. In some embodiments, the image processing may contain a subsequent step, performed by the quality checker 218, of determining the confidence level of the identified text, e.g., words, numerical values, etc.

The online concierge system 102 identifies 430 an amount associated with a tax item within the image of the receipt. Based on the words and numerical values determined by the image processing, the online concierge system 102 uses the text processor 224 to determine a tax item on the receipt and its associated amount, such as percentage, and the paid monetary amount. The amount associated with the tax item is reflective of tax that is actually paid by the picker since the value is extracted from the image of the receipt. In some embodiments, the online concierge system 102 may analyze the extracted text from the image of the receipt and identify one or more items in the receipt. The online concierge system 102 may further identify numerical values associated with each item. The online concierge system 102 may use a rules-based NLP algorithm. For example, the extracted text may include a string of "Tax 1—7.000%—$1.43." The online concierge system 102 may segment the string into one or more tokens, such as, "Tax1", "7.000%", and "$1.43" based on one or more specific delimiter characters in the string. Alternatively, the online concierge system 102 may use a trained machine learning model for segmenting the extracted text strings into tokens. The online concierge system 102 may then determine whether one or more of the tokens are associated with a tax item based on training images. When a token is determined to be associated with a tax item, then a value that is associated with the token may be further identified as the tax amount in the receipt. In other embodiments, the online concierge system 102 may classify the extracted text into categories, e.g., name of item, amount, etc. In some embodiments, the online concierge system 102 may use a trained machine learning model to specifically recognize a tax item in an image of a receipt. For example, the online concierge system 102 may specifically recognize the word "tax" and identify an amount and/or percentage value associated with the word "tax" as the amount of tax paid in the receipt. Further, the online concierge system 102 may determine an amount for an item spatially by determining the corresponding text. For example, the numerical values representing the amount and/or percentage closest to the word "Tax" on the receipt are associated. The text processor 224 identifies the items and their associated amounts and prices for all instances of text within the receipt, as determined by the text extractor 222.

The online concierge system 102 determines 435 a confidence score of the amount that is associated with the tax item based on the identified text in the image of the receipt. In some embodiments, the confidence score may be output by a trained machine learning model to infer whether the identified amount is the tax paid from the receipt. It can be an estimate of the level of confidence, i.e., the degree of accuracy, on the identified tax amount. In some examples, the confidence score is determined based in part on the quality of the image of the receipt, e.g., whether the captured image is blurry. Alternatively, the confidence score may be based in part on the quality of the physical receipt, e.g., whether the receipt is crumpled. Further, the confidence score can be determined based on a set of heuristic rules. For example, in case that the receipt is smudged, incomplete, etc., the online concierge system 102 may determine the confidence score by checking the cumulative imagery containing all receipt line items based on the order's contents. In some embodiments, the tokens segmented from the extracted text that are associated with actual tax paid can be input as training data for the machine learning model. These tokens can be used as classifiers to output a confidence score to infer a degree of accuracy of the identified amount as a tax amount.

The online concierge system 102 assigns 440 tax results of receipts into different categories by using a confidence score thresholding logic. The tax result of a receipt may include both the identified tax amount as recorded on the receipt and the determined confidence score of the identified tax amount. The confidence score thresholding logic may include one or more threshold values. By comparing with the one or more threshold values, a confidence score can be determined as high, intermediate, or low. In some embodiments, the tax result may be assigned into one of three categories. Category I may include tax results with a combination of high confidence scores and/or low tax amounts (e.g., monetary values); Category II may include tax results with intermediate confidence scores; and Category III may include tax results with low confidence scores and/or an atypically large tax amounts and tax results with intermediate confidence scores and atypically large tax amounts. For example, the online concierge system 102 may determine a range of an estimated tax amount of an order based on the cost of the order. The online concierge system 102 may first determine an estimated cost for the order as a whole based on the sale prices of each item, and then compute a range of feasible taxes. If the identified tax amount falls out of the range, it may be determined as an atypically large/small tax amount, which may be declined or sent to an auditor for review.

The online concierge system 102 sends 445 the tax results in Category I to the reconciliation database 240 for tax reconciliation. As the tax results in Category I have high confidence scores, indicating a high degree of accuracy, these tax results may be directly sent to the reconciliation database 240 without human auditing, resulting in significant labor savings.

The online concierge system 102 may send the tax results in Category III to a queue for subsequent review by human auditors. Tax results with low confidence scores are assumed to be non-viable and are given a high priority within the queue on the assumption that the OCR extraction failed. In some embodiments, the online concierge system 102 may send tax results in Category II to the reconciliation database 240; alternatively, the tax results in Category II may be sent to the reconciliation database 240 and the queue for human auditing with a low priority. An intermediate confidence score indicates a relatively high degree of accuracy, although not as high as a high confidence score. As such, a tax result with an intermediate confidence score is probably valid, and its accuracy can be increased if it is reviewed and confirmed by human auditing. In the event that such a receipt is reviewed by an auditor, the auditor may create a new tax result to the reconciliation database 240 which will replace the previous tax result that is generated by OCR and machine learning models. The tax results that are reviewed by the auditor will be input as training data to re-train the machine learning model.

In some embodiments, the online concierge system 102 may reconcile the taxes in the reconciliation database 240 with the corresponding retailer periodically, for example, monthly, quarterly, etc. The online concierge system 102 may aggregate the tax data which includes one or more identified tax amounts, and share the resulting tax reconciliation data along with any documentation to the retailer. The retailer then proceeds to make payment to reimburse the tax amounts paid by the online concierge system 102.

The process 400 provides an improved method for tax reconciliation systems. The online concierge system 102 determines the tax amounts paid as recorded on the receipt, and sends the tax result to the retailer for reimbursement. Therefore, online concierge system 102 is not double taxed for the order. Additionally, the automated image processing and analysis performed by the online concierge system 102 to determine the tax amount actually recorded in the receipt based on an image reduces the input time and effort of the picker 108. The process 400 improves equitability of cost.

Figure 5A:
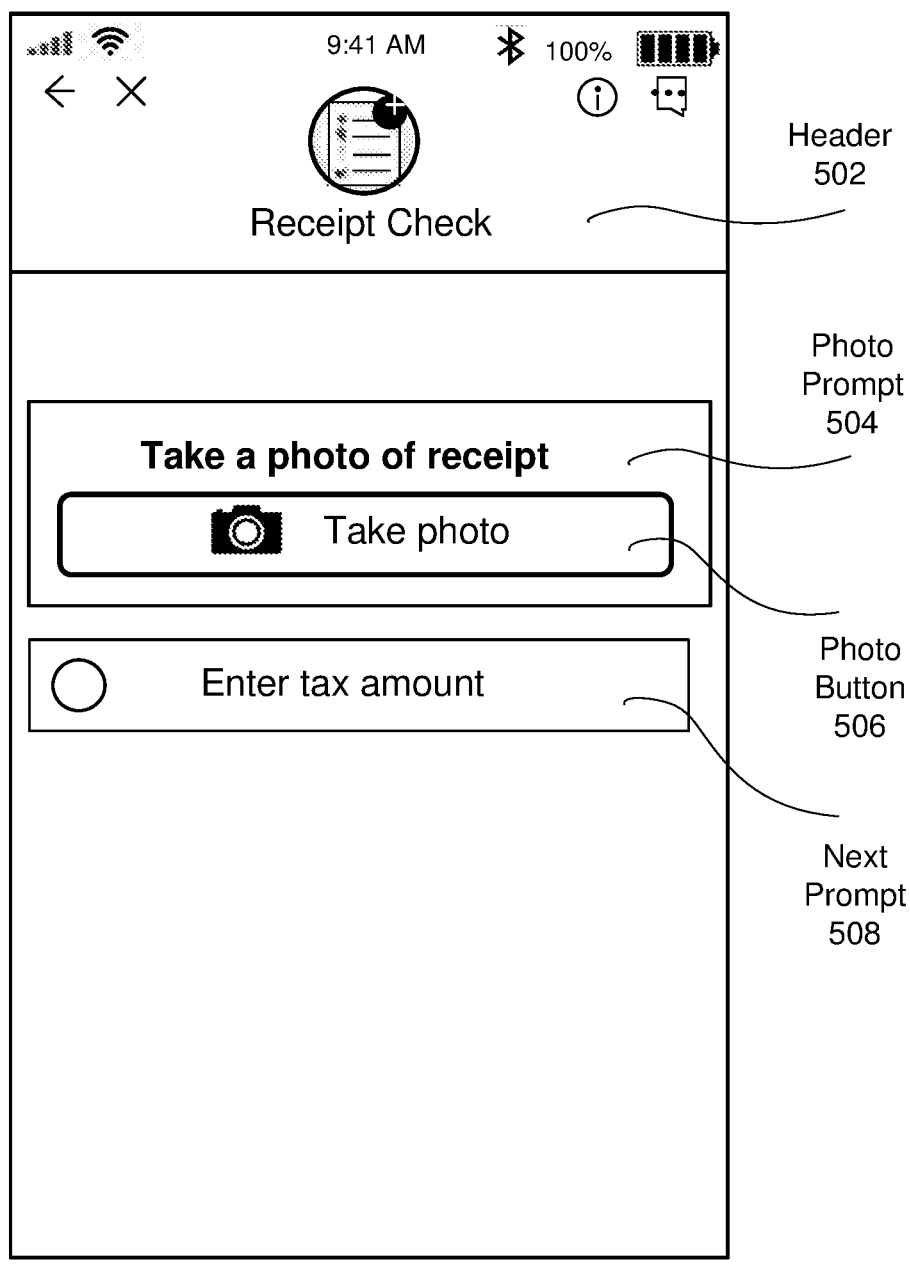
FIG. 5A-5C are example user interfaces for the picker to input training data via the PMA, according to one or more embodiments.
Figure 5B:
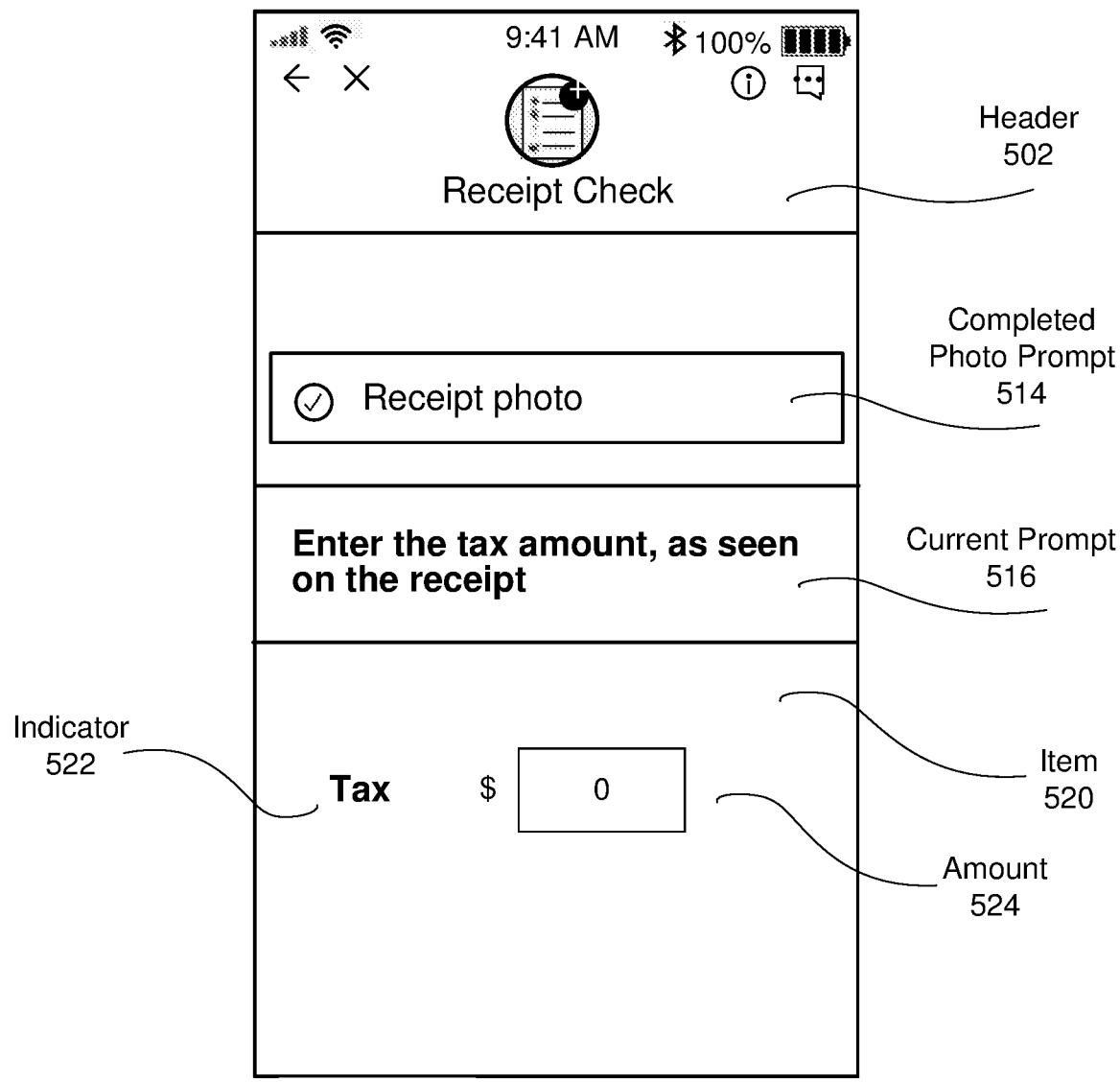
Figure 5C:
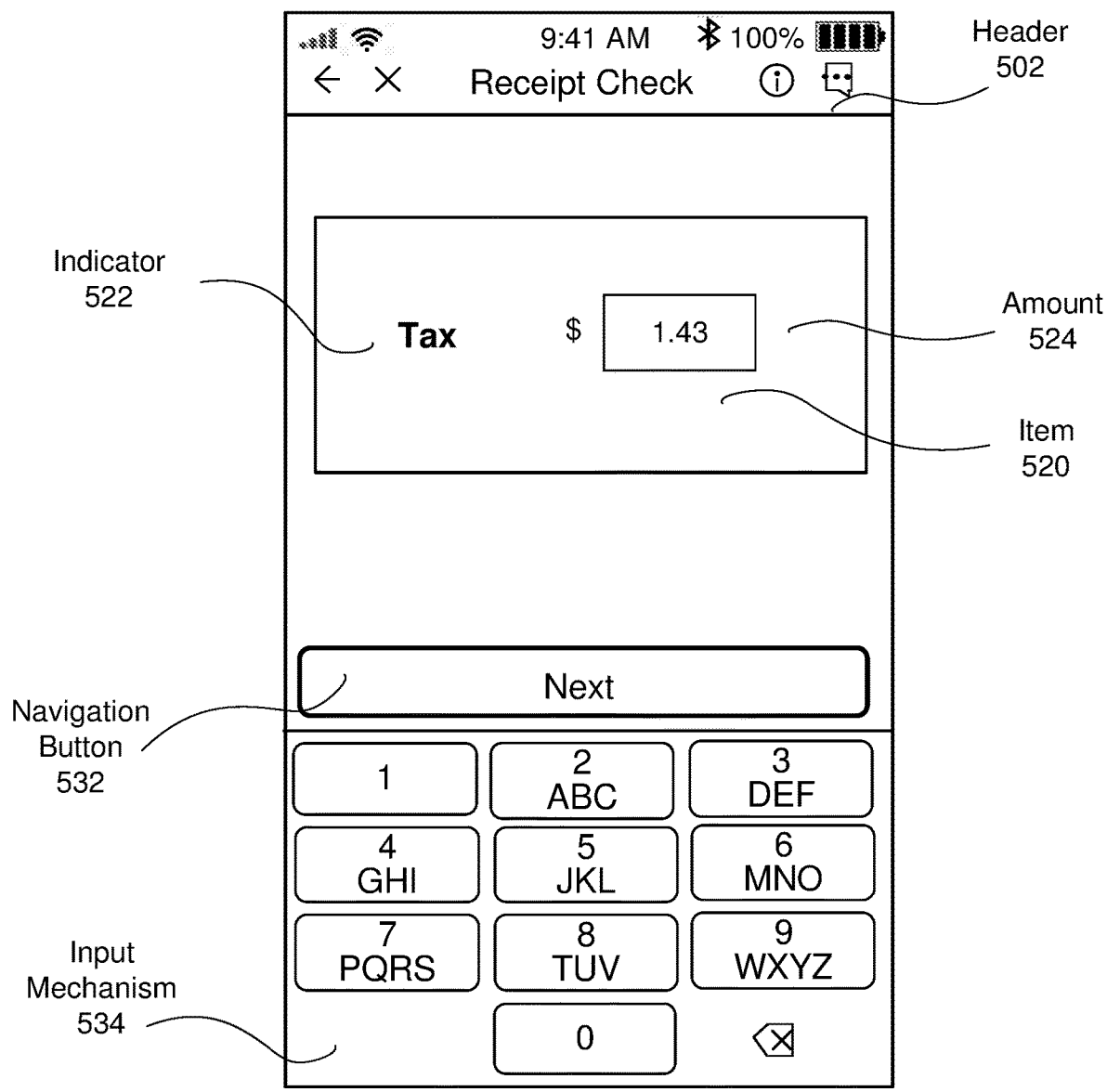

FIG. 5A-5C are example user interfaces for the picker to input training data via the PMA, according to one or more embodiments. The user interfaces shown in FIGS. 5A-5C are example embodiments of displays generated by the PMA 112 on a mobile device. Alternative embodiments may include additional or fewer features or otherwise be structured and displayed differently in a user interface. The data input via the example user interfaces of FIGS. 5A-5C is stored in the training images 226.

FIG. 5A shows a user interface 500 prompting the picker 108 to capture an image of the receipt. The interface 500 may be displayed to the picker 108 via the PMA 112, in particular via the imaging module 328, subsequent to purchase of some or all of a set of items specified in an order. For example, the user interface 500 may be provided for display by the imaging module 328 responsive to the PMA 112 receiving an indication from the picker 108 that an order has been fulfilled.

The user interface 500 includes a header 502, which includes an indication that this stage of the fulfillment of the order is a receipt check. The header 502 also includes other indications of time, data signal, and/or battery, as consistent with the operating system of the mobile device running the PMA 112. The user interface 500 includes a photo prompt 504 which indicates an action item for the picker 108 is to take a photo of the receipt. The photo prompt 504 includes a photo button 506, which the picker 108 selects to take a photo of the receipt. When selected, the photo button launches a camera attached to or associated with the mobile device running the PMA 112. The picker 108 uses the camera to take an image of the receipt. In another embodiment, the photo prompt 504 enables the picker to upload an existing image of the receipt. The user interface 500 also includes a next prompt 508, which indicates a future action item is to check tax item, as discussed in greater detail below.

FIG. 5B shows a user interface 510 prompting the picker 108 to enter an actual amount of the tax on the receipt. The user interface 510 includes the header 502. The user interface 510 also includes a completed photo prompt 514 indicating that the picker 108 has successfully uploaded a photo using the imaging module 328.

The user interface 510 includes a current prompt 516 prompting the picker 108 to enter the actual tax amount as seen on the receipt. The interface 510 further includes an item 520 for which the picker has been prompted to enter the actual tax amount paid. The item 520 includes an indicator 522, which may be an image, a graphic, and/or a name of the item 520. In some embodiments, the indicator 522 may display the word "Tax" that indicates the item 520 is to enter the amount of the tax seen on the receipt. The item 520 includes an amount 524, which is an empty field for the user to enter the actual amount paid of the item 520 as printed on the receipt.

In some embodiments, the PMA 112 provides for displaying all the items included in the order (i.e., not just the tax item) to be able to tag and classify each instance of text in the image of the receipt for use in the training images 226. The picker 108 selects the amount 524 and manually inputs the actual tax amount paid on the item 520 as printed on the receipt.

FIG. 5C shows a user interface 540 prompting the picker 108 to enter an actual tax amount paid on the receipt. The user interface 540 includes the header 502, and the item 520, further including the indicator 522 and the amount 524. In the embodiment shown by the user interface 540, the picker has manually input the actual tax amount $1.43 in the field for the amount 524. The user interface 540 further includes a navigation button 532, which when selected by the picker 108 navigates to the next item in the order. The user interface 540 also includes an input mechanism 534 which enables the picker 108 to manually input values into the amount 524 field. The input mechanism 534 may be a keyboard-like user interface provided for display and interaction as shown in the embodiment of FIG. 5C. In other embodiments, an input mechanism may be a physical keyboard, speech-to-text device, or any other means of manually inputting values.

The data input by the picker 108 via the user interfaces 500, 510, 540, including the image of the receipt and actual paid tax amount, is stored in the training images 226 and used to train machine learning models, such as the quality checker 218, the text identifier 220, and the text processor 224.

FIG. 6A-6F are example user interfaces for the picker to upload an image of a receipt via the PMA, according to one or more embodiments. The user interfaces shown in FIGS. 6A-6F are example embodiments of displays generated by the PMA 112 on a mobile device. Alternative embodiments may include additional or fewer features or otherwise be structured and displayed differently in a user interface. The data input via the example user interfaces of FIGS. 6A-6F is stored in the order database 230. The example interfaces shown in FIGS. 6A-6F are used to properly charge the customer 104 for actual amounts purchased of items in the order.

Figure 6A:
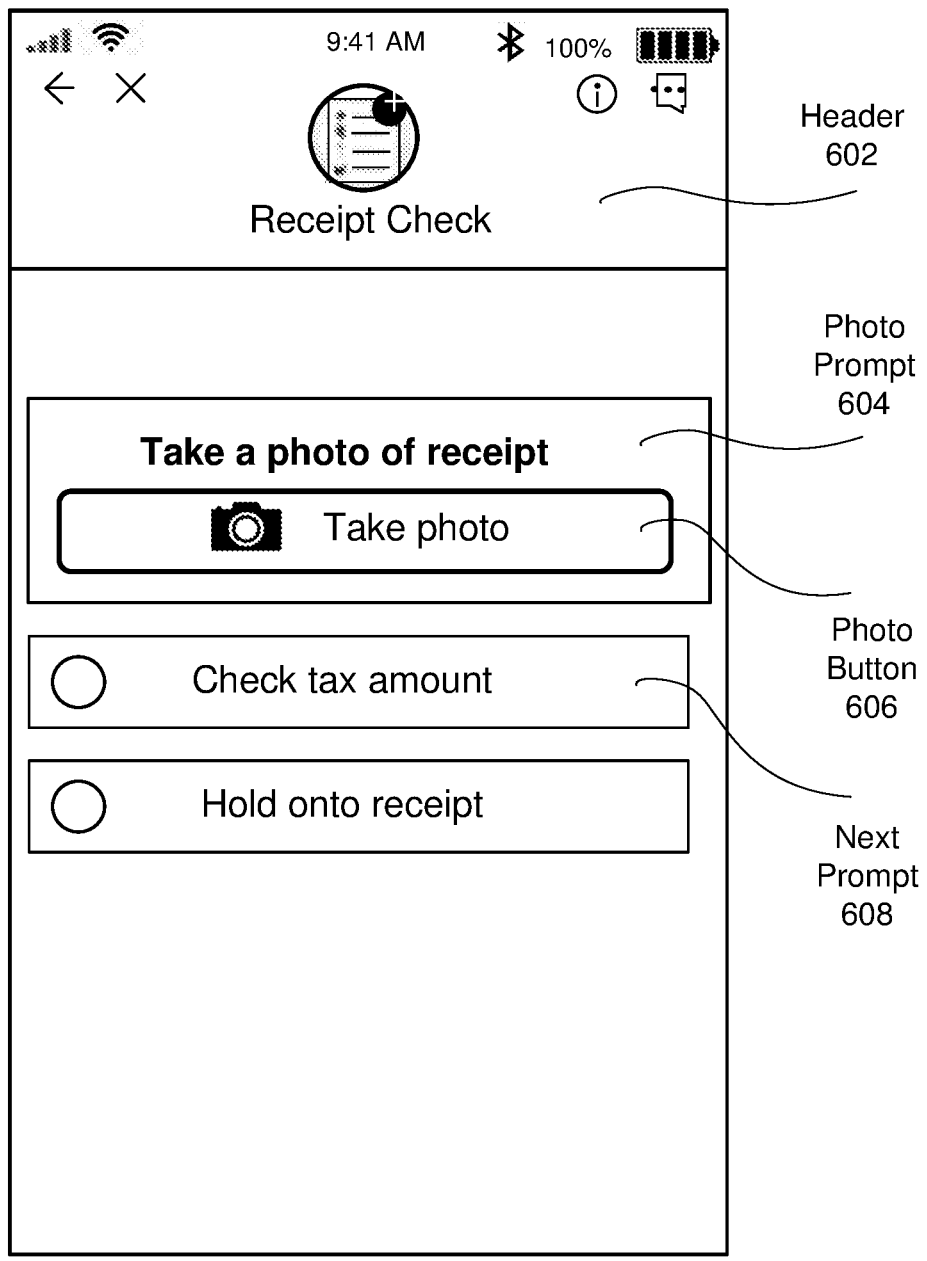
FIG. 6A-6F are example user interfaces for the picker to upload an image of a receipt via the PMA, according to one or more embodiments.

FIG. 6A shows a user interface 600 prompting the picker 108 to capture an image of the receipt. The interface 600 may be displayed to the picker 108 via the PMA 112, in particular via the imaging module 328, subsequent to purchase of some or all of a set of items specified in an order. For example, the user interface 600 may be provided for display by the imaging module 328 responsive to the PMA 112 receiving an indication from the picker 108 that an order has been fulfilled.

The user interface 600 includes a header 602, which includes an indication that this stage of the fulfillment of the order is a receipt check. The header 602 also includes other indications of time, data signal, and/or battery, as consistent with the operating system of the mobile device running the PMA 112. The user interface 600 includes a photo prompt 604 which indicates an action item for the picker 108 is to take a photo of the receipt. The photo prompt 604 includes a photo button 606, which the picker 108 selects to take a photo of the receipt. When selected, the photo button launches a camera attached to or associated with the mobile device running the PMA 112. The picker 108 uses the camera to take an image of the receipt. In another embodiment, the photo prompt 604 enables the picker to upload an existing image of the receipt. The user interface 600 also includes a next prompt 608, which indicates a future action item is to check tax item, as discussed in greater detail below, and may include more prompts before or after the photo prompt 604 and next prompt 608. In some instances, the user interface 600 may additionally include a text box that shares feedback with the picker 108 on the quality of the image and/or positioning recommendations for the camera to improve image quality as the picker 108 uses the camera to take images.

Figure 6B:
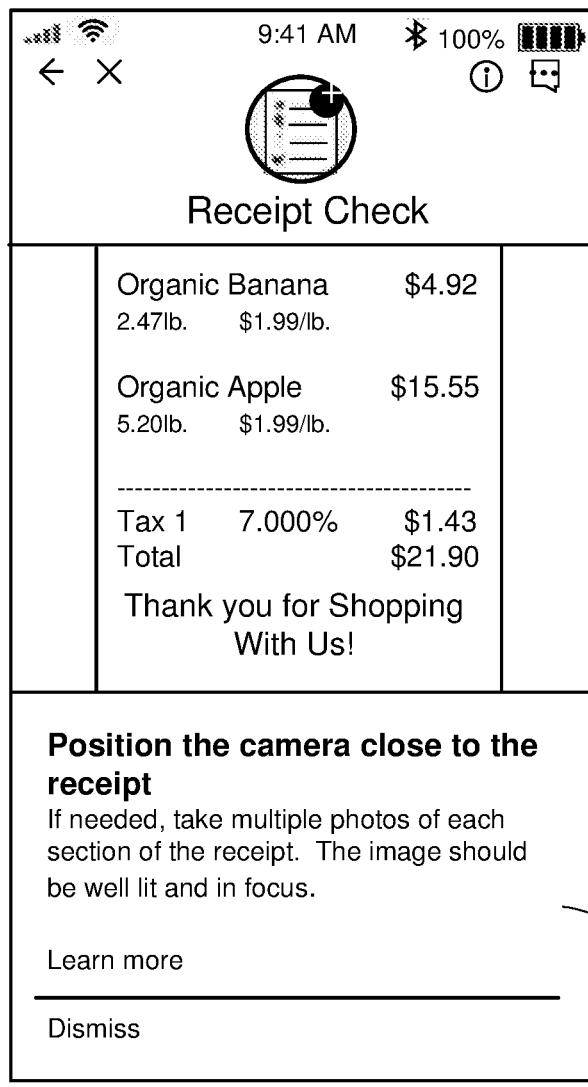

FIG. 6B shows a user interface 610 including capture information 611 for the picker capturing the image. The capture information includes a description of how to position the camera to capture the picture and describes that in some instances, the picker may need to capture multiple images to capture the entire receipt. The user interface 610 may include further widgets the user may interact with to dismiss the capture information 611, learn more about the capture information, and exit out of the user interface 610.

Figure 6C:
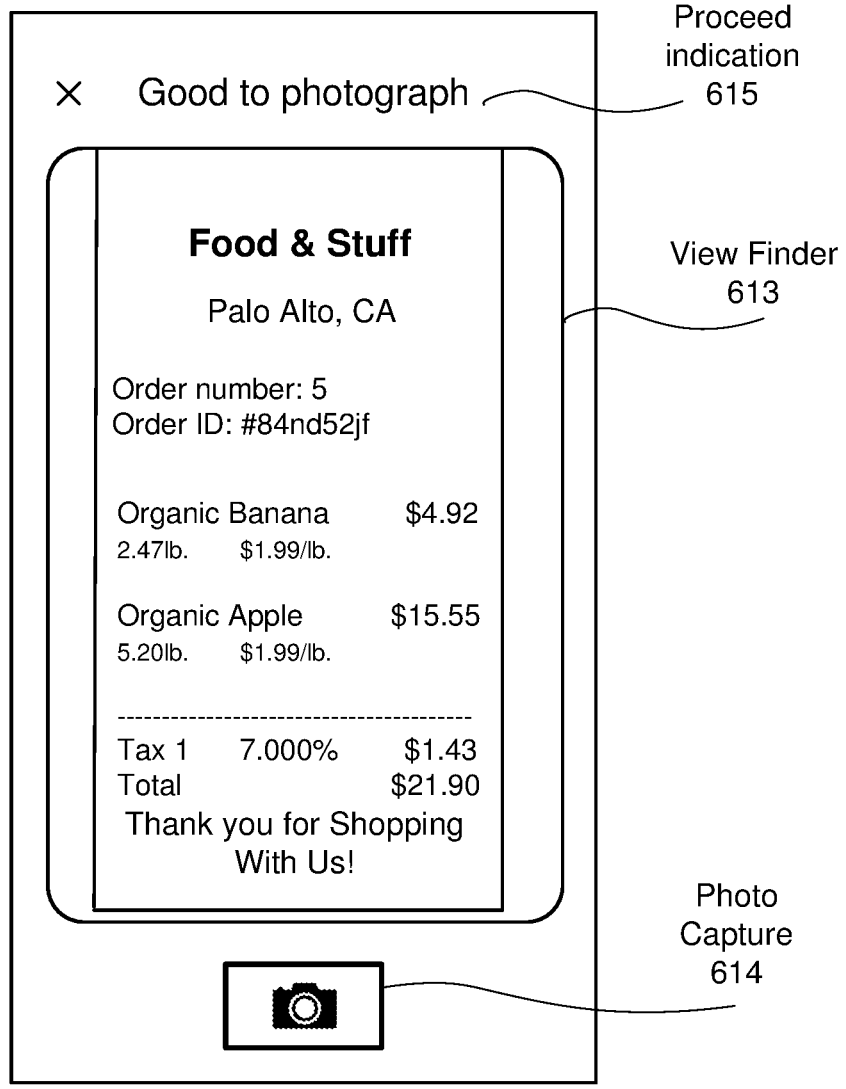

FIG. 6C shows a user interface 612 enabling the picker 108 to capture an image of the receipt. The user interface 612 shows a view finder 613 enabling the picker 108 to view the area the imaging module 328 is ready to capture. In the embodiment shown in FIG. 6C, the view finder 613 contains an image of the receipt. The user interface 612 includes a proceed indication 615 that indicates whether the image of the receipt as shown in the view finder 613 is ready for capture based on an assessment of image quality. To capture the image of the receipt shown in the view finder 613, the picker selects photo capture 614. When the picker 108 selects the photo capture 614, the image of the receipt in the view finder 613 is captured and provided by the PMA 112 to the online concierge system 102. In some embodiments, if the receipt is double-sided or too long to fit in one image, the picker may capture multiple images that are provided to the PMA 112. The image processing module 216 processes the image of the receipt and identifies the actual amount purchased of each item.

Figure 6D:
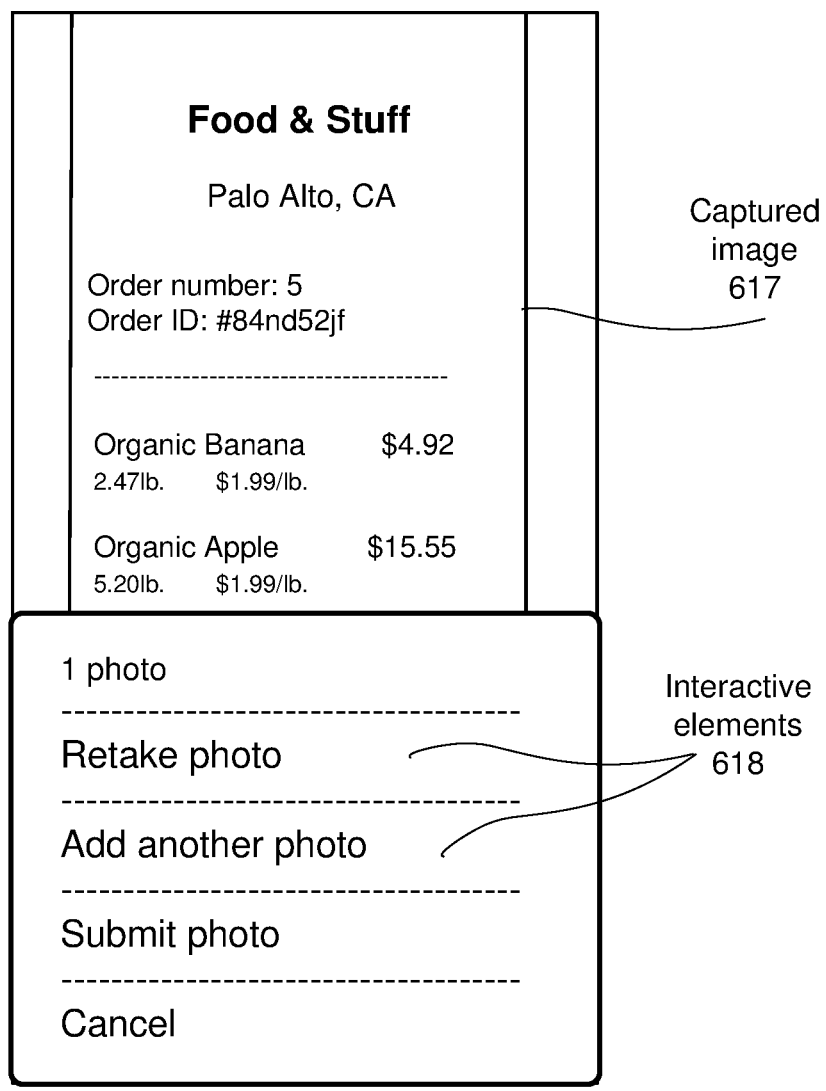

FIG. 6D shows a user interface 616 depicting the captured image 617 of the receipt. The user interface 616 prompts the picker 108 to select one of the interactive elements 618 to either retake the captured image, which leads back to the user interface 612 shown in FIG. 6C, add another image of the receipt, submit the captured image 617, or cancel the uploading the captured image 617 of the receipt. If the picker 108 selects to submit the photo via the interactive elements 618, the PMA 112 may display the user interface of FIG. 6E. Alternatively, the online concierge system 102 may transmit the captured image 617 (or images, in some embodiments) to an auditor mobile application, as shown in FIG. 7.

Figure 6E:
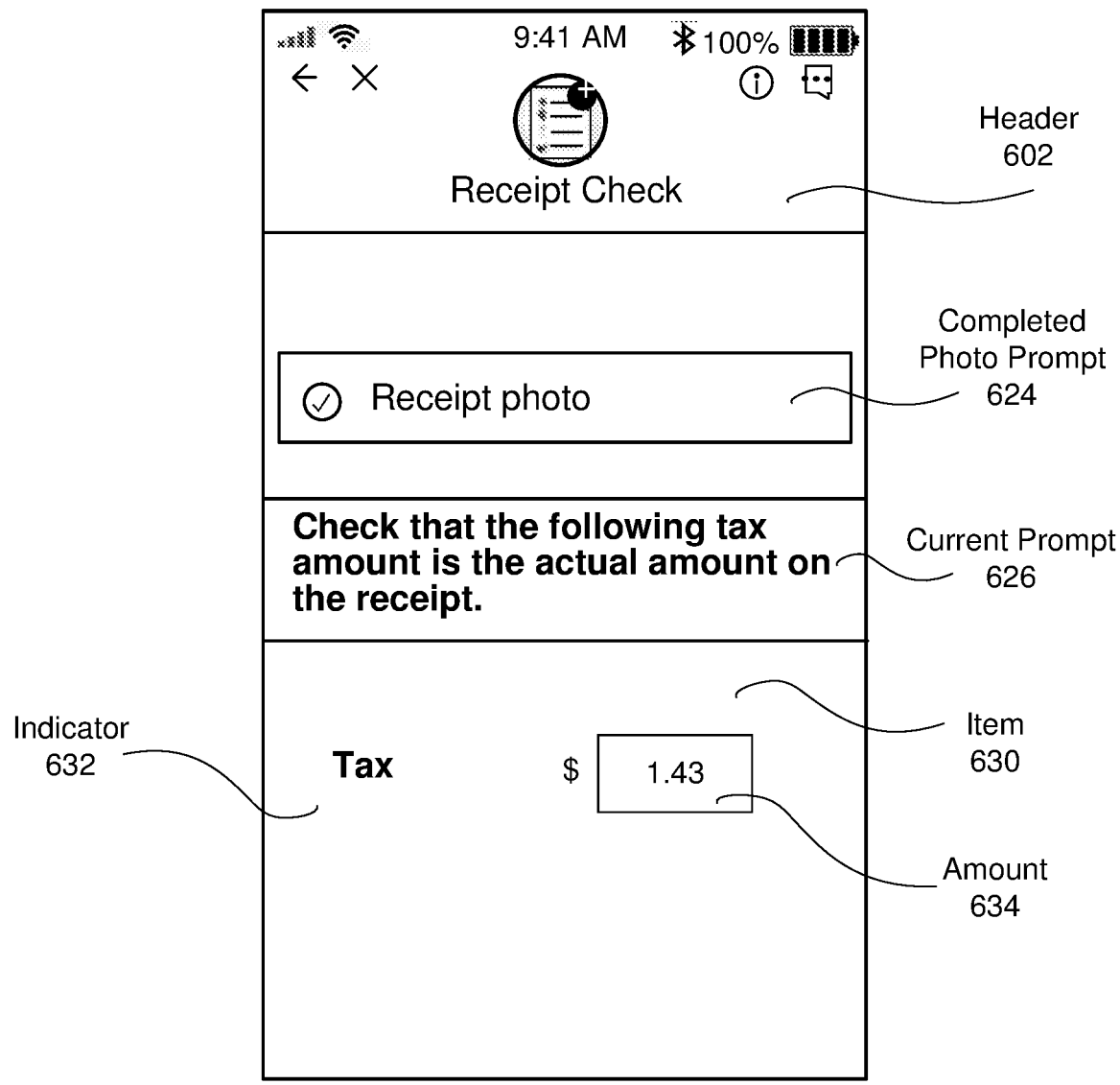
Figure 7:
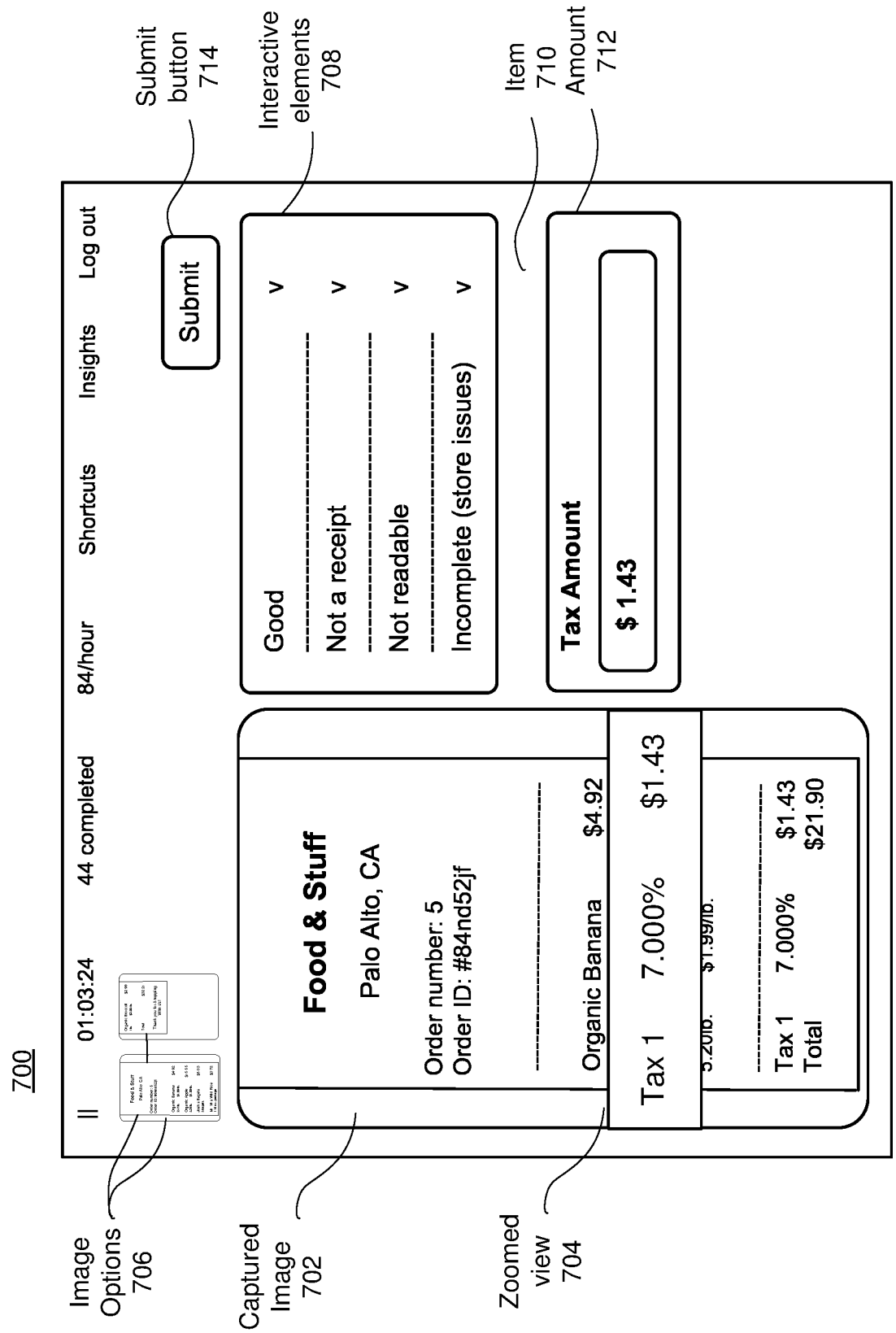
FIG. 7 is an example user interface for an auditor to enter a tax amount for a receipt, according to one or more embodiments.

FIG. 6E shows a user interface 620 prompting the picker 108 to check each measured quantity of each item on the receipt is the actual amount purchased. The user interface 620 includes the header 602. The user interface 620 also includes a completed photo prompt 624 indicating that the picker 108 has successfully uploaded a photo using the imaging module 328.

The user interface 620 includes a current prompt 626 prompting the picker 108 to check that the identified tax amount is the actual tax amount as seen on the receipt. That is, the picker 108 is checking that the image processing module 216 correctly identified the actual tax amount paid. The user interface 620 further includes an item 630 for which the picker has been prompted to check that the amount is the actual tax amount paid. The item 630 includes an indicator 632, which may be an image, a graphic, and/or a name of the item 630. In some embodiments, the indicator 632 may display the word "Tax" that indicates the item 630 is to check the amount of the tax seen on the receipt. The item 630 includes an amount 634, which is a field populated with an amount of the tax as identified in the image of the receipt by the image processing module 216.

Figure 6F:
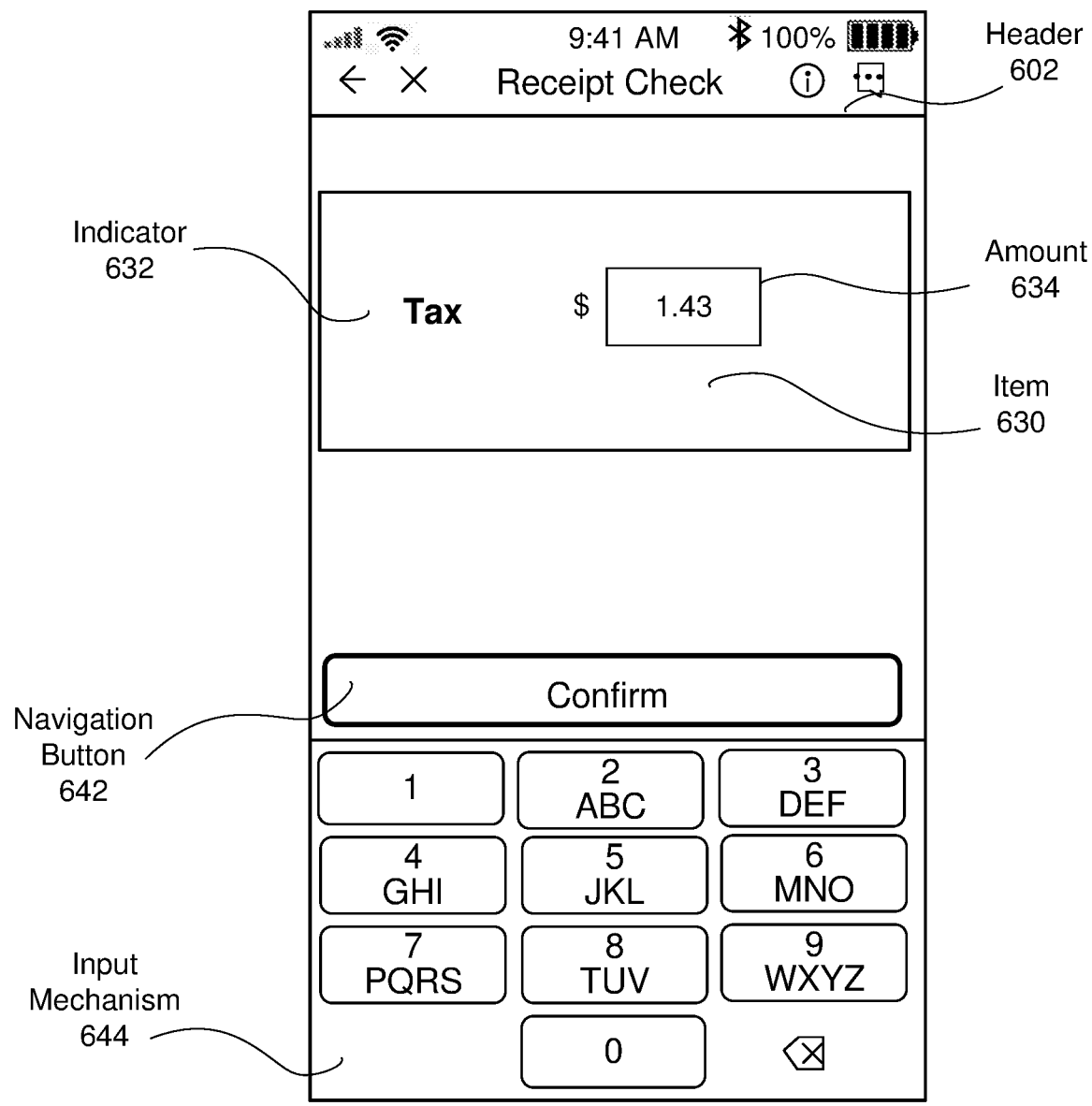

FIG. 6F shows a user interface 650 prompting the picker 108 to check whether the identified tax amount is the actual tax amount paid. The user interface 650 includes the header 602 and the item 630, further including the indicator 632 and the amount 634. In the embodiment shown by the user interface 650, the picker has manually confirmed the actual tax amount $1.43 in the field for the amount 634. The picker 108 uses a navigation button 642 to manually confirm the amount 634 matches the actual tax amount as printed on the receipt. Selecting the navigation button 642 to confirm the actual amount purchased also navigates the picker to the next item to be confirmed.

If the amount identified by the image processing module 216 is incorrect (i.e., does not match the actual tax amount as printed on the receipt), the picker 108 uses the input mechanism 644 to manually input the actual tax amount. The input mechanism 644 is substantially similar to the input mechanism 534. In some embodiments, when the input mechanism 644 is used to correct the amount 634 with the actual tax amount, the associated data is used to re-train the machine learning models. That is, the actual tax amount and the image of the receipt are added to the training images 226 and used by the image processing module 216 to re-train the quality checker 218, the text identifier 220, and the text extractor 222.

When the picker 108 has finished verifying that the identified amount is the actual tax amount paid, or otherwise inputting the actual tax amount, the PMA 112 provides the actual tax amount to the online concierge system 102.

FIG. 7 is an example user interface 700 for an auditor to enter the tax amount for a receipt, according to one or more embodiments. The user interface shown in FIG. 7 is an example embodiment of displays generated by an auditor mobile application on a computing device. The computing device may be a mobile device or any suitable computing device. Alternative embodiments of FIG. 7 may include additional or fewer features or otherwise be structured and displayed differently in a user interface. The data input via the example user interface of FIG. 7 is stored in the order database 230. The example user interface 700 shown in FIG. 7 is used to determine an actual amount of an order and properly charge the customer 104 the actual amount instead of an estimated cost for an order.

The user interface 700 allows an auditor to check that the identified tax amount is the actual tax amount paid for the order. That is, the auditor checking that the image processing module 216 correctly identified the actual tax amount as recorded on the receipt. The user interface 700 may be displayed to the auditor subsequent to a fulfillment of an order. For example, the user interface 700 may be provided for display to the auditor by the imaging module 328 responsive to the PMA 112 receiving an indication from the picker 108 that an order has been fulfilled.

The user interface 700 includes a captured image 702 of a receipt of the order. In embodiments where the receipt is pictured in multiple images, the auditor may choose which captured image 702 of the receipt to view via the image options 706. The user interface 700 also includes a zoomed view 704 of a portion of the receipt, which the auditor may move around via the user interface 700 to view magnified portions of the captured image 702. The user interface may display statistics for the auditor, such as time spent reviewing receipts, and number of receipts reviewed, number of receipts viewed over time and include widgets for viewing shortcuts, viewing insights, or logging out of the auditor's auditing account.

The user interface 700 includes a number of interactive elements 708 that the auditor may interact with to indicate information about the captured image 702. For instance, the auditor may interact with the interactive elements 708 of the user interface 700 to indicate that the captured image 702 of the receipt is good for use, is not actually a receipt, is unreadable, or is incomplete, among other information. Alternatively, the user interface 700 may display a notification which comprises a selectable option for the auditor to confirm whether the image is readable. The user interface 700 also includes text fields (or other interactive elements) in which the auditor may enter an actual amount 712 of an item 710 based on the captured image 702. In some embodiments, the item 710 is the tax paid for the order as seen on the captured image 702. The text field corresponds to the item 710 shown in the zoomed view 704 and may update as the auditor moves the zoomed view 704. In the embodiment shown in FIG. 7, the auditor has manually input the actual tax amount of $1.43 in the text field for the amount 712.

Furthermore, the user interface 700 includes a submit button 714, which the auditor may interact with to confirm the information entered via the interactive elements 708 and amount 712 entered for the item 710. The auditor may interact with the submit button 714 to indicate that the amount 712 on the receipt has been entered. When the auditor has finished entering the amount 712, the auditor mobile application provides the actual tax amount paid by the online concierge system 102. The online concierge system 102 may send the tax result to the reconciliation database 240 for tax reconciliation, as previously discussed.

In some embodiments, each captured image 702 of a receipt may be shown via user interface 700 to an auditor for review. In other embodiments, an auditor is only shown a captured image of a receipt if the tax amount 712 identified by the image processing module 216 as having a low or intermediate confidence score. In these embodiments, the auditor manually input the amount 712. Furthermore, in some instances, when the auditor corrects the amount 712 for a receipt, the associated data is used to re-train the machine learning models described above. That is, the actual tax amount and the captured image 702 of the receipt are added to the training images 226 and used by the image processing module 216 to re-train the quality checker 218, the text identifier 220, and the text extractor 222. In some other embodiments, the user interface 700 may display a notification to the auditor. The notification may include a tax amount, an option to confirm the tax amount is correct, and an alternate option to decline the tax amount and input a correct amount of taxes paid.

In some embodiments, the online concierge system 102 may use an auditor calibration logic to evaluate the quality of an auditor's work. The auditor calibration logic may include OCR and machine learning models. For example, a random subset of human audit results can be queried and compared against the counterpart results that are generated by OCR and machine learning models. Comparing the subset of results to those records where the OCR performed at the highest levels of reliability, then an auditor having a high error rate may be identified. Subsequent audits created by this auditor might be reviewed by a colleague or supervisor. In some embodiments, additional trainings might be provided to this auditor.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which includes any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
at a computer system comprising at least one processor and memory:
receiving, from a computing device associated with a shopper, an image of a receipt for an order that has been fulfilled;
applying an image processing algorithm to identify a tax item in the image of the receipt, wherein applying the image processing algorithm comprises:
determining a location of an instance of text that is related to the tax item in the image;
applying a bounding box around the instance of text in the image at the determined location; and
applying an optical character recognition (OCR) to the image within the bounding box to extract text that is related to the tax item from the image;
identifying, using the extracted text, a tax amount associated with the tax item in the image, the tax amount representing an amount of tax paid at a point-of-sale (POS) system, wherein identifying the tax amount comprises:
generating, using the extracted text, an input to a machine learning model by segmenting the extracted text into one or more tokens, wherein the machine learning model is trained with training data comprising tokens segmented from extracted text that are associated with actual tax paid,
applying the machine learning model to the one or more tokens, and
receiving, from the machine learning model, the tax amount associated with the tax item in the image;
determining a confidence score of the identified tax amount, the confidence score indicating a level of accuracy of the identified tax amount; and
performing an automated tax reconciliation process based on the tax amount and the confidence score.

2. The method of claim 1, further comprising:
applying a confidence score thresholding logic to assign the confidence score in three categories including: high, intermediate, and low.

3. The method of claim 2, further comprising:
sending, to an auditor, the image of the receipt and the tax amount having a low confidence score to confirm the tax amount is correct.

4. The method of claim 2, further comprising:
sending, to an auditor, the image of the receipt and the tax amount having an intermediate confidence score and a large monetary value to confirm the tax amount is correct.

5. The method of claim 1, further comprising:
displaying the image of the receipt to an auditor based on the tax amount and the confidence score; and
displaying, to the auditor, a notification comprising a selectable option to confirm whether the image is readable.

6. The method of claim 1, further comprising:
displaying, to an auditor, a notification comprising the tax amount, an option to confirm the tax amount is correct, and an alternate option to decline the tax amount and input a correct amount of taxes paid.

7. The method of claim 1, further comprising:
    determining whether the image of the receipt is of sufficient quality to resolve text of the receipt; and
    responsive to determining the image of the receipt is not of sufficient quality, prompting the shopper to take another image of the receipt.
8. The method of claim 1, wherein performing the automated tax reconciliation process comprises:
    retrieving tax data generated in a predetermined period of time, the tax data comprising one or more identified tax amounts;
    aggregating the one or more identified tax amounts to generate a tax reconciliation data; and
    sending the tax reconciliation data to a system to cause the system to reimburse the one or more identified tax amounts.
9. The method of claim 1, wherein identifying the tax amount further comprises:
    determining whether the image of the receipt is of sufficient quality to resolve text of the receipt;
    responsive to determining the image of the receipt is of sufficient quality, after the text being extracted, using the machine learning model to identify the tax amount from the extracted text.
10. A non-transitory computer-readable storage medium storing instructions, the instructions when executed cause a processor to:
    receive, from a computing device associated with a shopper, an image of a receipt for an order that has been fulfilled;
    apply an image processing algorithm to identify a tax item in the image of the receipt, wherein applying the image processing algorithm comprises:
        determining a location of an instance of text that is related to the tax item in the image;
        applying a bounding box around the instance of text in the image at the determined location; and
        applying an optical character recognition (OCR) to the image within the bounding box to extract text that is related to the tax item from the image;
    identify, using the extracted text, a tax amount associated with the tax item in the image, the tax amount representing an amount of tax paid at a point-of-sale (POS) system, wherein identifying the tax amount comprises:
        generating, using the extracted text, an input to a machine learning model by segmenting the extracted text into one or more tokens, wherein the machine learning model is trained with training data comprising tokens segmented from extracted text that are associated with actual tax paid,
        applying the machine learning model to the one or more tokens, and
        receiving, from the machine learning model, the tax amount associated with the tax item in the image;
    determine a confidence score of the identified tax amount, the confidence score indicating a level of accuracy of the identified tax amount; and
    perform an automated tax reconciliation process based on the tax amount and the confidence score.
11. The computer-readable storage medium of claim 10, further comprising instructions that when executed cause the processor to:
    apply a confidence score thresholding logic to assign the confidence score in three categories including: high, intermediate, and low.
12. The computer-readable storage medium of claim 11, further comprising instructions that when executed cause the processor to:
    send, to an auditor, the image of the receipt and the tax amount having a low confidence score to confirm the tax amount is correct.
13. The computer-readable storage medium of claim 11, further comprising instructions that when executed cause the processor to:
    send, to an auditor, the image of the receipt and the tax amount having an intermediate confidence score and a large monetary value to confirm the tax amount is correct.
14. The computer-readable storage medium of claim 10, further comprising instructions that when executed cause the processor to:
    display the image of the receipt to an auditor based on the tax amount and the confidence score; and
    display, to the auditor, a notification comprising a selectable option to confirm whether the image is readable.
15. The computer-readable storage medium of claim 10, wherein the instruction to perform the automated tax reconciliation process comprises:
    retrieving tax data generated in a predetermined period of time, the tax data comprising one or more identified tax amounts;
    aggregating the one or more identified tax amounts to generate a tax reconciliation data; and
    sending the tax reconciliation data to a system to cause the system to reimburse the one or more identified tax amounts.
16. The computer-readable storage medium of claim 10, further comprising instructions that when executed cause the processor to:
    determine whether the image of the receipt is of sufficient quality to resolve text of the receipt; and
    responsive to determining the image of the receipt is not of sufficient quality, prompt the shopper to take another image of the receipt.
17. The computer-readable storage medium of claim 10, wherein the instruction to identify the tax amount in the image of the receipt comprises:
    determining whether the image of the receipt is of sufficient quality to resolve text of the receipt;
    responsive to determining the image of the receipt is of sufficient quality, after the text being extracted, using the machine learning model to identify the tax amount from the extracted text.
18. A computer system comprising:
    a computer processor; and
    a non-transitory computer-readable storage medium storage instructions that when executed by the computer processor perform actions comprising:
        receiving, from a computing device associated with a shopper, an image of a receipt for an order that has been fulfilled;
        applying an image processing algorithm to identify a tax item in the image of the receipt, wherein applying the image processing algorithm comprises:
            determining a location of an instance of text that is related to the tax item in the image;
            applying a bounding box around the instance of text in the image at the determined location; and
            applying an optical character recognition (OCR) to the image within the bounding box to extract text that is related to the tax item from the image;

identifying, using the extracted text, a tax amount associated with the tax item in the image, the tax amount representing an amount of tax paid at a point-of-sale (POS) system, wherein identifying the tax amount comprises:
  generating, using the extracted text, an input to a machine learning model by segmenting the extracted text into one or more tokens, wherein the machine learning model is trained with training data comprising tokens segmented from extracted text that are associated with actual tax paid,
  applying the machine learning model to the one or more tokens, and
  receiving, from the machine learning model, the tax amount associated with the tax item in the image;
determining a confidence score of the identified tax amount, the confidence score indicating a level of accuracy of the identified tax amount; and
performing an automated tax reconciliation process based on the tax amount and the confidence score.

* * * * *